TWISTING SPINDLE BALLOON CONTROL

Original Filed Oct. 29, 1952 5 Sheets-Sheet 1

INVENTOR

Alfred W. Vibber

TWISTING SPINDLE BALLOON CONTROL

Original Filed Oct. 29, 1952 5 Sheets-Sheet 2

INVENTOR.

Alfred W. Vibber

TWISTING SPINDLE BALLOON CONTROL

Original Filed Oct. 29, 1952 5 Sheets-Sheet 3

INVENTOR

Alfred W. Vibber

TWISTING SPINDLE BALLOON CONTROL

Original Filed Oct. 29, 1952 5 Sheets-Sheet 4

INVENTOR.
Alfred W. Vibber

TWISTING SPINDLE BALLOON CONTROL

Original Filed Oct. 29, 1952 5 Sheets-Sheet 5

INVENTOR.
Alfred W. Vibber

United States Patent Office

Re. 24,840
Reissued June 14, 1960

24,840

TWISTING SPINDLE BALLOON CONTROL

Alfred W. Vibber, 116 Pinehurst Ave., New York 33, N.Y.

Original No. 2,851,848, dated Sept. 16, 1958, Ser. No. 317,406, Oct. 29, 1952. Application for reissue Oct. 2, 1959, Ser. No. 846,529

38 Claims. (Cl. 57—58.55)

Matter enclosed in heavy brackets [ ] appears in the original patent but forms no part of this reissue specification; matter printed in italics indicates the additions made by reissue.

This invention relates to a method of and an apparatus for continuously measuring the diameter of a flying loop or baloon of elongated flexible material such as yarn, as in a yarn twisting spindle, and also to a method of and an apparatus for automatically and continuously controlling the diameter of a balloon into or from which the flexible material passes under variable tension. The invention also relates to a system for continously twisting and taking up elongated flexible material, such material proceeding from a source of supply into a twisting mechanism, made in accordance with the invention, employed as a downtwister. In a preferred embodiment of the system of the invention there is employed apparatus forming cord from a plurality of yarn supplies, preferably twisting spindles, while the material is continuously in motion, such system incorporating the improved spindle of the invention for doubling the separate strands fed thereto.

This application is a continuation-in-part of application Serial No. 225,209, filed May 8, 1951, *now Patent No. 2,843,997*, application Serial No. 238,215, filed July 24, 1951, now Patent No. 2,729,932, and application Serial No. 261,704, filed December 14, 1951, all bearing the same title.

In the illustrative embodiment, the balloon measuring device of the invention, by which the balloon diameter controlling apparatus may be operated, is a rotatable, balloon apex guiding eye, mounted at a substantially fixed distance from the balloon creating and maintaining flyer, such eye being rotated by the upper end of the balloon of material passing therethrough, such rotation of the eye being opposed by a resilient means. The action on the eye is such that, when the balloon expands, it exerts a greater torque upon the eye, tending to turn the eye in the same direction as the turning of the balloon. Such rotation of the eye may be employed, as shown in one embodiment, as a means for measuring the diameter of the balloon. The rotation of the eye may also be employed as a balloon measuring means which controls the relative speeds of the feeding of the material into and out of the balloon, whereby the balloon may be maintained at substantially a mediate or desired optimum diameter.

The invention will be more readily understood by reference to the accompanying drawings forming a part of the specification.

Figure 6:
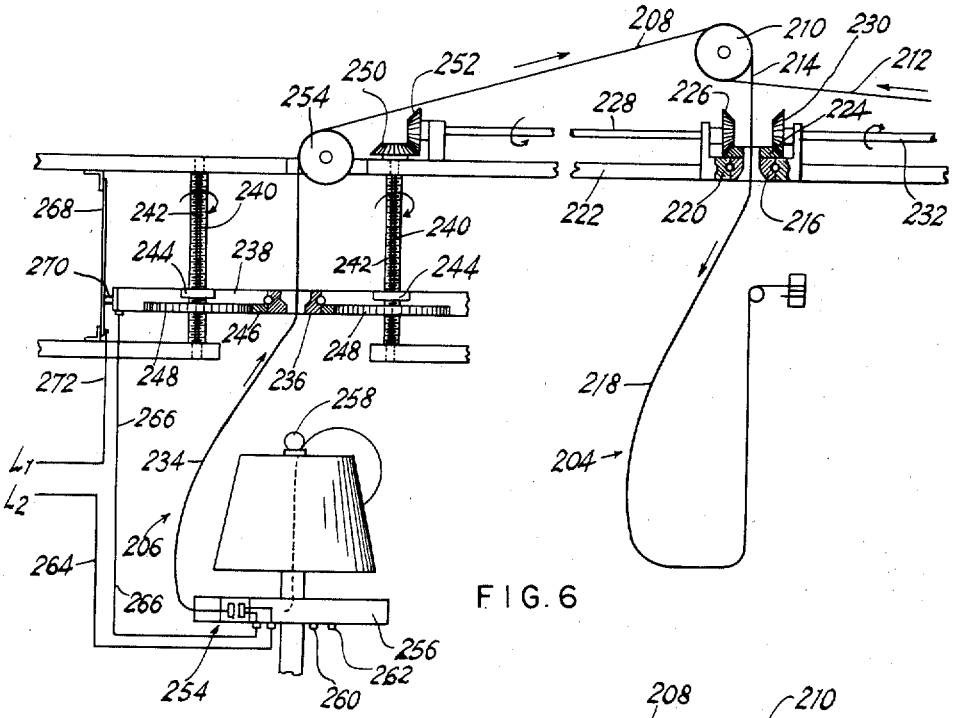
Figure 7:
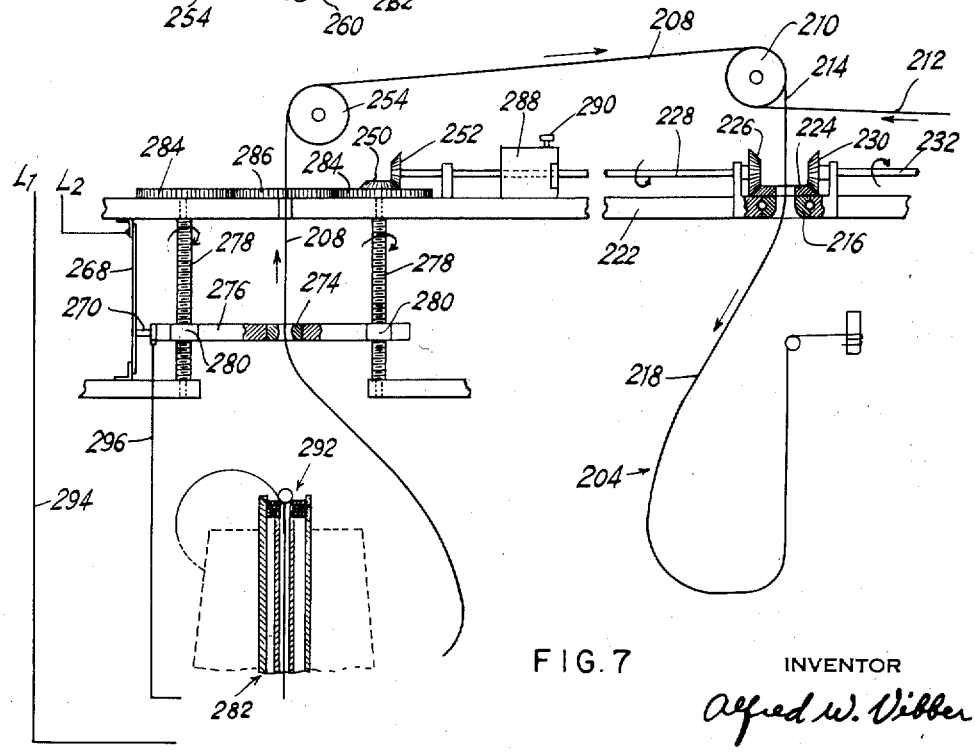
Figure 8:
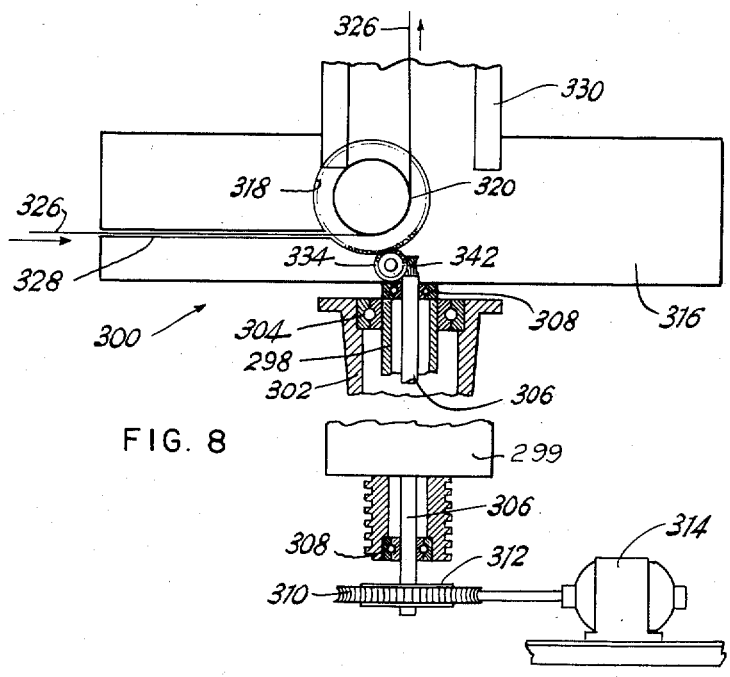
Figure 9:
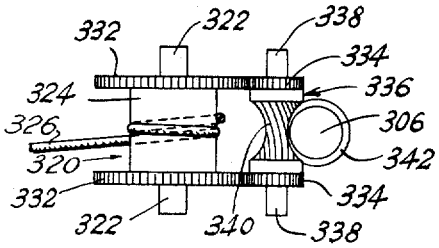
Figure 10:
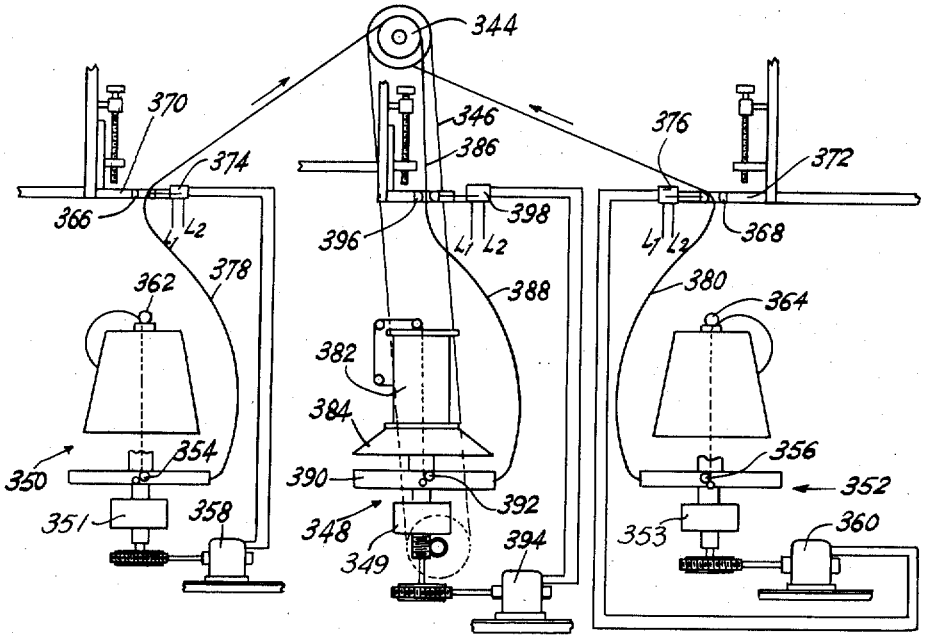
Figure 12:
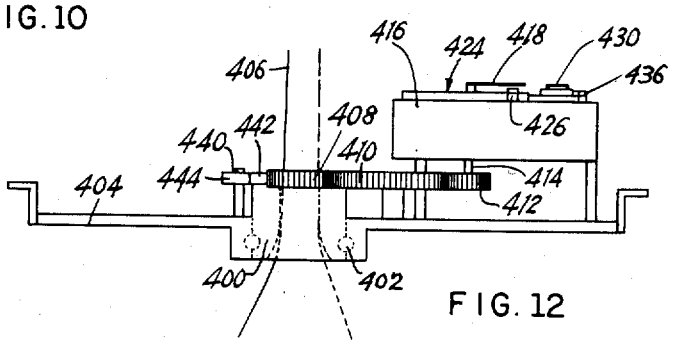
Figure 11:
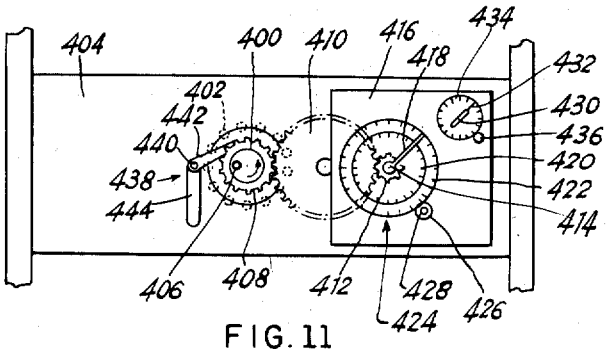

Fig. 6 is a somewhat schematic view, partially in vertical section and partially in front elevation, of a second yarn twisting and doubling system in accordance with the invention, such system including a rotatable eye mechanism at the top of the take-up balloon for measuring the balloon of the cabling spindle and means operated by such measuring mechanism for varying the size of, and the back-tension imposed upon, the singles balloons;

Fig. 7 is a somewhat diagrammatic view, partially in vertical section and partially in front elevation, of another embodiment of the system of the invention, such system including mechanism for measuring the balloon of the cabling spindle and for varying the size of, and the back-tension imposed upon, the singles balloons;

Fig. 8 is a fragmentary view, partially in elevation and partially in vertical section, of a portion of an alternative design of twisting mechanism in the vicinity of the flyer, the mechanism including means in the flyer for controlling the speed of travel of the flexible material therethrough;

Fig. 9 is a somewhat diagrammatic view in plan of the gearing driving the cord advancing roller 320, the worm, worm gear, and roller 320 being shown in plan in their connected driving relationship but expanded laterally and projected on a plane for clarity of illustration;

Fig. 10 is a somewhat diagrammatic view of a fourth multiple spindle system in accordance with the invention, the singles and doubles twisting mechanisms of such system each including the flexible material speed controlling apparatus of Figs. 8 and 9, each such speed controlling apparatus being under the control of the rotatable material balloon apex guiding eye of the respective twisting mechanism;

Fig. 11 is a view in plan of a further embodiment of the balloon diameter measuring apparatus of the invention; and Fig. 12 is an enlarged view, partially in front elevation and partially in section, of the apparatus of Fig. 11.

Figure 1:
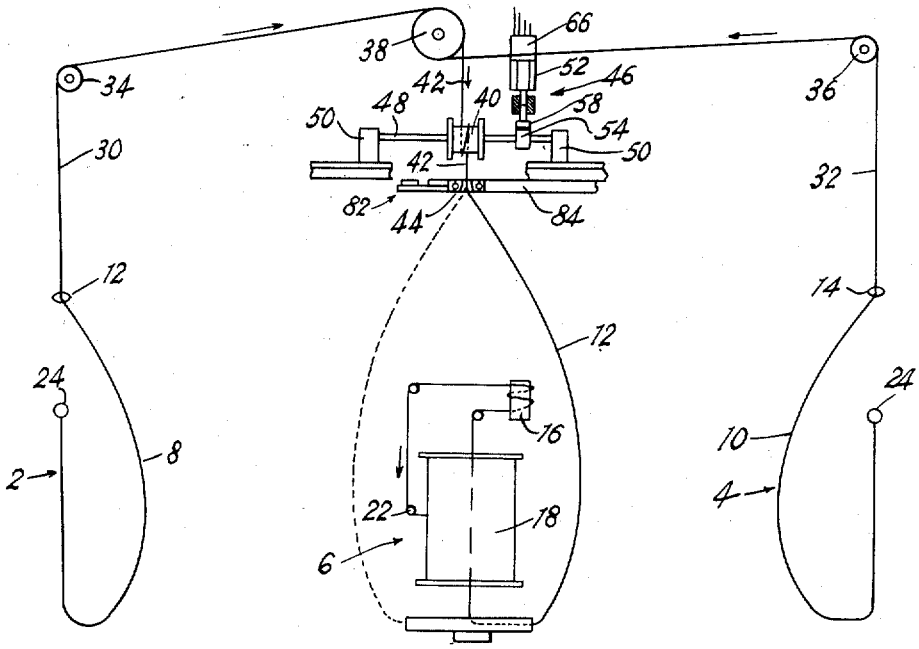
Fig. 1 is a somewhat diagrammatic view in side elevation of a three-spindle yarn twisting and doubling apparatus, the apparatus varying the tension in the take-up balloon by variation in the braking effect imposed on the yarn at the entering end of the balloon, such braking effect being under the control of the balloon diameter measuring eye at the top of the take-up balloon.

The embodiment of the general combination of the apparatus shown in Fig. 1, to which the mechanism of the invention is applied, is generally of the type shown and described in the patent to Uhlig, No. 248,837, issued November 15, 1949. In the embodiment shown, such apparatus consists of three spindles, spindles 2 and 4 being of the two-for-one singles supply type, the yarn being delivered therefrom in balloons 8 and 10, respectively, through guiding eyes 12 and 14, respectively, to combining, or doubling, and twisting mechanism, generally designated by the reference character 6. Twisting mechanism 6 is likewise of the two-for-one twisting type, the combined threads receiving a first twist in their passage down through the incoming balloon 12 and a second twist in their upward travel vertically axially through the center driving shaft (not shown) of the mechanism. Upon emerging from the top of such center hollow shaft, the cord is engaged by the positively driven capstan 16 driven in synchronism with such shaft so as to supply the power to withdraw the cord from the balloon 12 to overcome the retarding tension of the balloon 12 and to withdraw the singles from their balloons 8 and 10. After leaving the capstan 16, the cord is wound upon the bobbin 18, being laid thereon by reciprocating traverse mechanism (not shown) having the guiding cord laying pulley 22.

In the preferred embodiment of the apparatus shown, such apparatus is employed for the control of the diameter of the balloon 12 of the system shown in Fig. 1. It is to be understood, however, that the mechanism of the invention is not necessarily confined to use in such system and that the apparatus shown herein is illustrative only.

Experience has shown that there is little, if any difficulty in the over-all control of the singles balloons of the three-spindle system shown when proper adjustment is made of the retarding means 24 at the top of each singles spindle, and of the diameter of the flyer and the height which its eye lies above the spindle. Difficulty has been experienced, however, with control of the take-up balloon 12, wherein if the balloon is too tight, it rubs upon the upper rub-ring (not shown) to the consequent damage of the cord, and, if such balloon is too loose, it rubs upon the outer guard member (not shown) if one is used, also to the damage of the cord. The balloon control apparatus of the present invention is designed to hold the diameter of the take-up balloon within close limits, so that such balloon neither contacts the inner wear ring or inner guard nor contacts the outer guard or housing member of the mechanism 6, in spite of variations in the back tension upon the material entering the take-up balloon.

In the embodiment of the apparatus shown in Fig. 1, the singles supply spindles 2 and 4 are driven at the same constant high speed and in the same direction by means of a belt (not shown) entrained over the drive pulley of a motor (not shown). The central cabling and twisting mechanism 6 is driven in the opposite direction at a slightly slower but constant high speed. The twisted singles 30 and 32 proceed upwardly from the balloons of their respective spindles 2 and 4, over the idle guide pulleys 34 and 36, respectively, and thence to the idle gathering pulley 38, from which the combined generally parallel but as yet untwisted-upon-each-other threads 42 are led to the drum 40 of the tension imposing means. After passing around drum 40 several times, thereby to minimize slippage between it and the drum, the combined material 42 is led downwardly through the eye 44 and thence into the balloon 12 of the twisting mechanism 6. The tension imposing drum 40, is in the embodiment shown, under the control of a retarding or braking means 46. Drum 40 is mounted upon the rotatably mounted horizontal shaft 48 which, as shown, is mounted in the pillow blocks 50 supported on appropriate portions of the machine frame. The retarding or braking means 46 is designed to impose, once the machine has been placed in operation and adjusted, a suitable controlled variable retarding torque upon the drum 40 to maintain the diameter of balloon 12 within predetermined limits. Breaking means 46 is designed to impose upon the drum 40 a medial retarding torque when the balloon 12 is of the desired diameter, to impose by a separately powered prime mover controlled by the balloon measuring means a constantly increasing retarding force on the drum as the balloon 12 expands, and to impose upon drum 44, likewise by means of the separately powered prime mover under the control of the balloon measuring device, a constantly decreasing retarding force as balloon 12 contracts in diameter, thereby to maintain the balloon 12 of substantially constant diameter. It will be understood that the imposition of a larger rearding torque tends to slow the rotation of drum 40, and that as the retarding torque decreases, the faster drum 40 tends to rotate.

Figure 4:
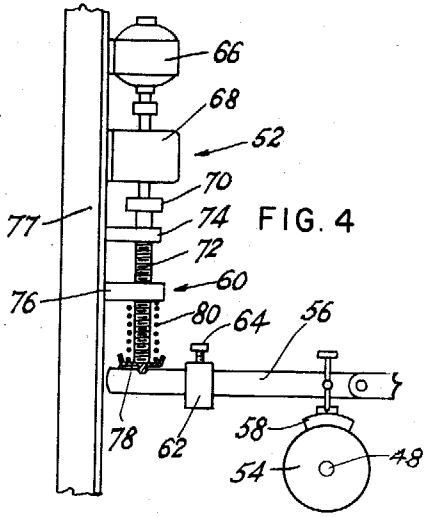
Fig. 4 is a detailed view in side elevation of the brake operating upon the tension applying means at the infeeding end of the take-up balloon and of the motor selectively to adjustably apply such brake.

The construction of the retarding means 46 and of the separately powered means 52 for applying such retarding means is shown more clearly in Fig. 4. As there shown, there is secured to the shaft 48 a brake drum 54. Pivoted to a portion of the machine frame, as shown, is a brake lever 56. Pivoted to such brake lever at a position above brake drum 54 is a brake shoe 58, the brake shoe being held against the brake drum by means of the mechanism 60, to be described, and by means of the weight 62 slideable along lever 56 and held thereon in adjusted position by the thumb screw 64.

The mechanism 52, under the control of the balloon diameter and/or length measuring means to be described, consists of the small motor 66, the drive shaft of which is connected to the speed reducing means 68 which, in turn, is connected by the medium of coupling 70 to the vertical rotatable worm 72 which is mounted to rotate in the bearing providing support member 74. Threadedly engaged with the worm 72 is the nut 76, one side of which is slideably and non-rotatably engaged with a vertical guide way on the frame member 77, so that as the worm rotates, the nut will rise and fall depending upon the direction of rotation of the worm. As shown, a spring seat providing member 78 is supported on the left-hand end of a brake lever 56 by having a central projection thereon, such projection having a rounded bottom end, received within a seat on the lever. A coil spring 80 is telescoped around the lower end of the worm 72 and is positioned between the lower surface of nut 76 and the spring seat 78.

The spring 80 is preferably so chosen that when the nut 76 lies substantially centrally in its range of vertical travel the spring will impose sufficient pressure upon the brake lever 56, taken with the force also imposed thereon by weight 62 when the latter is placed at a fixed predetermined location lengthwise of lever 56, to cause the retarding or braking means 46 to impose sufficient retardation upon the material entering the doubles balloon to effect a balance in the system when the singles and doubles balloons have their preferred medial diameters. When the diameter of the doubles balloon decreases, the motor 66, in response to the balloon measuring means, will cause the worn 72 to rotate in such direction as to raise nut 76, thereby decreasing the counter-clockwise retarding torque imposed by means 60 upon the brake lever 56. The doubles balloon will thereupon expand to its preferred medial diameter. Should, however, the doubles balloon expand unduly, motor 66 in response to the balloon diameter measuring device, will rotate in a reverse direction, thereby to impel nut 76 downwardly, thus to impose a greater counter-clockwise torque upon brake lever 56. When the doubles balloon is at the preferred medial diameter, motor 66 remains at rest so as to hold nut 76 in its then correct position.

The balloon diameter and/or length measuring device, previously generally referred to, employed in the system shown in Fig. 1, includes the rotatable eye 44 guiding the upper end or apex of the take-up balloon 12, and the reversing switch, generally designated 82, operated by such rotatable eye and in turn controlling the motor 66 of the brake operating means of Fig. 4. The structures of such rotatable eye and of the switch operated thereby are more clearly shown in Figs. 2 and 3.

Figure 3:
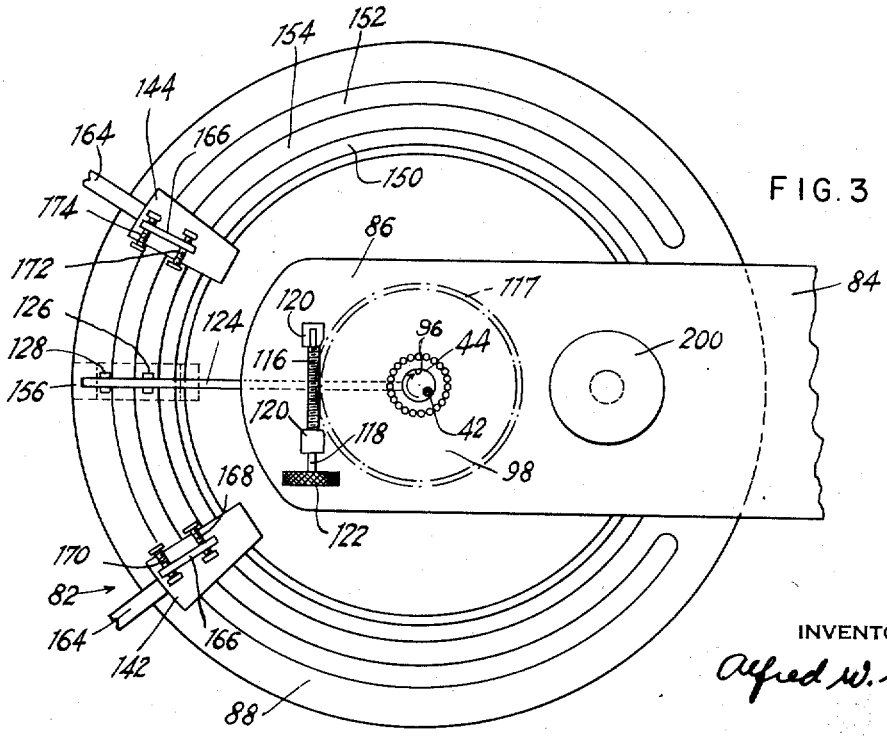
Fig. 3 is an enlarged view in plan of the apparatus shown in Fig. 2, the wires to the contacts on the switch arm being omitted for clarity of illustration.
Figure 2:
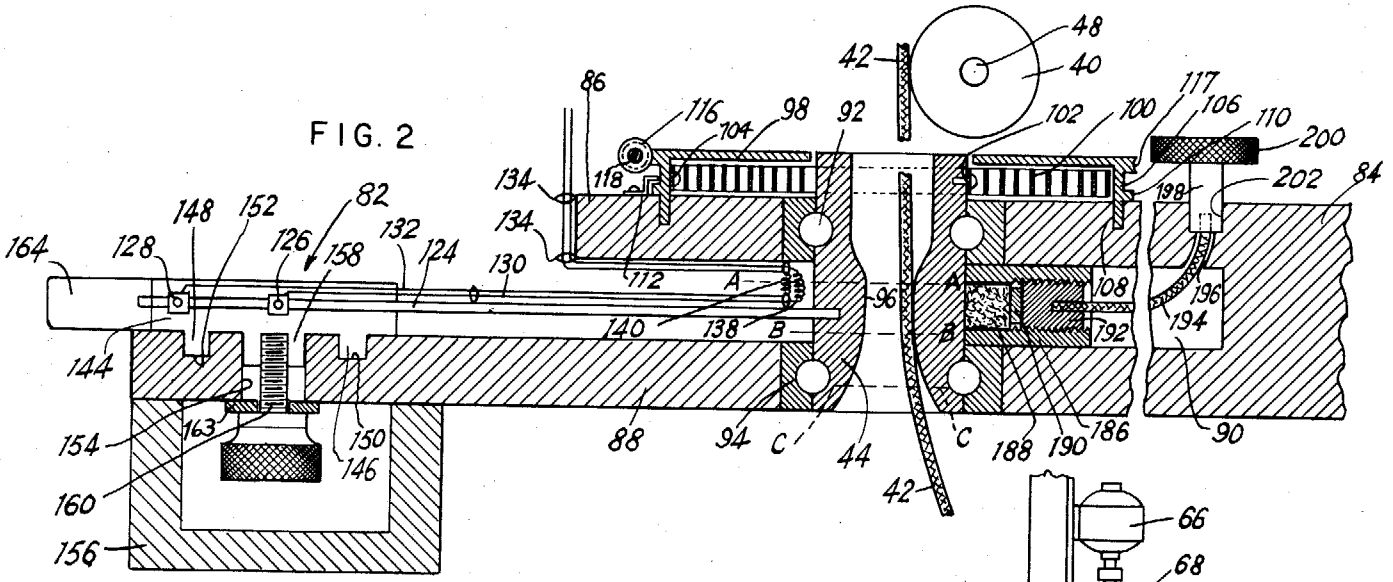
Fig. 2 is an enlarged view, partially in side elevation and partially in vertical axial section, of the rotatable balloon diameter measuring eye and of the balloon tension controlling switch operated thereby, the switch arm being shown in elevation.

As shown in Figs. 1, 2, and 3, the support 84 carrying the rotatable eye 44 and the switch 82 operated thereby extends from a convenient part of the machine frame to a position below the retarding drum 40. The member 84 positions the rotatable eye 44 coaxial with the twisting mechanism 6 by journalling it in bearings 92 and 94, respectively, in the top and bottom plates 86 and 88 of the support 84. Such plates are parallel and vertically spaced to provide the space 90 therebetween. The eye is provided with a bore 96 therethrough, such bore being in the shape of a solid of revolution, the bore having its minimum diameter at the level A—A approximately at its vertical center, the bore flaring smoothly in a downward direction toward the flyer, so that it has a greater diameter at the level B—B than it does at A—A and a still greater diameter at the level C—C. In Fig. 3, the elongated doubled material 42 is shown leaving the drum 40 and progressing into the bore of the eye, initially contacting such bore substantially at the level A—A. Contact between the material 42 and the bore of the eye, when the balloon is at the medial diameter shown, continues down approximately to the level B—B. When the balloon 12 increases in size, contact between the material 42 and the bore 96 of the eye will be increased from the level B—B down to, say, the level C—C, or it may even increase further, should the balloon increase markedly in diameter. The converse action will take place should the balloon contract, a slight contraction of the balloon causing the area of contact between the material 42 and the bore 96 to shorten, for example, to a level somewhat above the level B—B. A still further contraction of the balloon will further shorten such line of contact between the material and the bore of the eye.

It will be apparent that the eye 44 is subjected to the upward thrust of the upper end of the balloon 12, the downward thrust caused by frictional engagement between it and the downwardly travelling material passing therethrough, and the torque imposed upon it by reason of the whipping around of the upper end of the balloon 12, the cord being of smaller diameter than the bore through the eye and passing into it from a point, the periphery of the gathering pulley, spaced from the eye and lying substantially on the axis of the bore thereof, such whipping of the balloon tending to cause the eye to rotate in such direction as to follow the balloon. As the balloon 12 increases in diameter, the centrifugal force which its upper end exerts upon the rotatable eye 44 increases. The length of contact between the material and the bore of the eye also increases, such last effect, taken in conjunction with the downwardly flared configuration of the bore in the eye, producing an increasing total effective length of lever arm operating to rotate the eye 44 upon increase in diameter of the balloon. Thus the increased centrifugal force of the balloon upon increase of diameter of the balloon and such increased effective lever arm under the same conditions tending to rotate the eye 44 are additive.

With factors such as flyer speed, flyer diameter, balloon height, and characteristics of the strands being twisted constant, as they will be during the filling of a bobbin, and usually during the filling of many bobbins in a production run, the torque imposed on the eye 44 by the balloon at diameters within the operative range thereof will bear a fixed determinable relationship to the balloon diameter. Thus the torque imposed on the eye 44 by the balloon 12 may be used as a means of measuring the diameter of the balloon, as by the preparation of a torque-diameter curve for the machine with the other above recited factors constant. Further, as will appear in connection with the apparatus of Figs. 11 and 12, a means applying torque to eye 44 to oppose its turning by the balloon 12 may be variously calibrated to read directly in terms of the torque at which the two torques balance, balloon diameter, balloon tension, etc.

In the apparatus of Figs. 1–5, inclusive, in which the torque-responsive eye is used to control the diameter of its balloon, the torque exerted on the eye 44 by the apex of the balloon is opposed by a selectively adjustable resilient means, such as a coil spring. Such spring 100 is shown contained within a spring barrel 98, the outer end of the spring being connected at 104 to the barrel and the inner end of the spring being connected at 102 to the eye 44. The barrel 98 has a vertical peripheral flange 106 which is rotatably received in the annular slot 108 in the upper surface of the upper plate 86 of the support. The outer surface of flange 106 of the barrel is provided with a radial flange 110, such radial flange cooperating with the angularly spaced hold-down clips 112, of which one is shown, attached to the top of the upper support to retain the barrel in place. Rotation of the spring barrel to wind the spring 100 to impose predetermined torques on eye 44 is effected by the worm 116 meshing with the worm gear 117 on the upper peripheral edge of the spring barrel. Such worm is supported on the worm shaft 118 held in the supports 120, turning of the worm being effected by the knob 122. The worm and worm gear are irreversible, so that the spring barrel will remain in the adjusted position.

The eye 44 carries thereon a radially projecting switch arm 124 made of insulating material, such arm extending into the space 90 between the upper and lower plates 86 and 88 of the eye support. The switch arm 124 carries two contacts 126 and 128 spaced and insulated from each other, such contacts being connected, respectively, with lead wires 130 and 132. Such wires are brought in to the switch arm through the supporting eyes 134 on the top support plate 86 and through the supporting eyes 136 on the top of the switch arm. Connection between the fixed and oscillating portions of such wires, supported on the top plate of the support and the switch arm, respectively, are effected through the flexible lead wires 138 and 140 positioned close to the eye 44.

The contacts 126 and 128 on the switch arm cooperate with adjustable contacts supported on the two adjustable contact supporting plates 142 and 144. The plates 142 and 144, which are made of insulating material, are adjustably positioned on the bottom plate 88 so that they can be positioned in selected locations coaxial of the eye over the major portion of 360°. Such adjustment allows both plates to be adjusted angularly about the axis of the eye, the plates being positioned close to each other so that a slight angular movement of the eye will make or break the circuit through the switch, or allows the plates to be markedly separated from each other in the manner indicated in Fig. 3 so that the contact arm attached to the eye must swing through a substantial angle from one set of contacts to the other. The adjustment of plates 142 and 144 is effected by the provision of the curved shoes 146 and 148 on the bottom of each of such plates, such shoes fitting in the slots 150 and 152, respectively, in the plate 88. Between the slots 150 and 152, the support 88 is slotted entirely therethrough with a circular slot 154, the parts of support 88 inwardly and outwardly of such slot 154 being connected together remote from eye 44 by the bridge member 156. A boss 158 on each of plates 142 and 144 fits into the slot 154, the plates being secured in adjusted position on the support by means of the stud 160 threadedly fitting into the boss 158, such stud being tightened against the support through the interposed washer 163. The angular spacing of the plates 142 and 144 is facilitated, upon the loosening of the studs 160, by use of the handles 164 protruding radially outwardly of each of the plates. Each of the plates 142 and 144 has molded integrally therewith the upstanding flange 166, such flange on plate 142 holding the adjustable screw contacts 168 and 170 and on plate 144 holding similar contacts 172 and 174. The screw contacts are positioned radially of the eye at locations to cooperate with the contacts 126 and 128, respectively, on the contact arm 124. In Fig. 3, the contact plates are shown spaced about 45° apart. They may, however, be set close together so that a very small angular movement of the contact arm will suffice to break the circuit through one of the sets of screw contacts on one plate and to effect the circuit through the other such set. When the contacts 126 and 128 on the contact arm 124 lie between the respective contacts 168, 170, 172, and 174, touching none of them, the circuit through the reversing switch is broken and the motor 66 of the brake applying mechanism is at rest.

Figure 5:
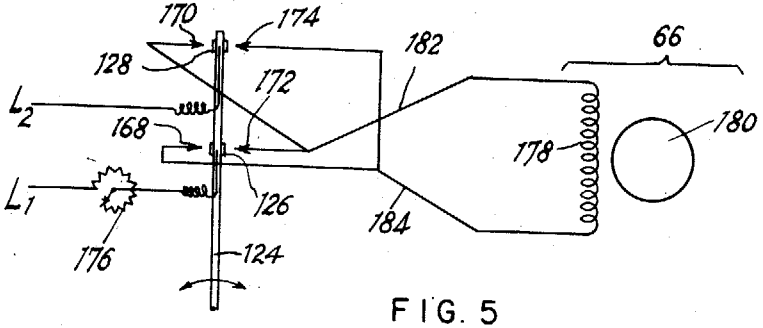
Fig. 5 is a wiring diagram showing the means whereby the motor in Fig. 4 is controlled by the balloon diameter measuring means.

In Fig. 5, there is shown the control circuit whereby the above described reversing switch controls the motor 66.

The switch arm 124 occupies the same position relative to the pairs of contacts in Fig. 5 that it does in Fig. 3. In such position, which is that which the switch arm occupies when the doubles balloon has the preferred medial diameter, the motor 66 is de-energized. It will be apparent that, should the lever 124 turn clockwise in Fig. 5 the circuit will be completed through line $L_1$, manually adjustable rheostat 176, and wire 182 to the field 178 of the motor 66, a similar current path being effected from line $L_2$ through contacts 128 and 174, and wire 184, to the field 178 of the motor. It will be assumed that such is the position occupied by the contactor arm 124 when the balloon has expanded unduly and the arm has been rotated into such position by the eye 44. Thereupon the motor 66 will rotate in such direction as to impel nut 76 downwardly to increase the retarding tension imposed upon the material entering the balloon. Should the doubles balloon then contract unduly, the contact arm 124 will turn counter-clockwise, whereupon contact 126 will touch contact 168 and the other contact on the contactor arm will engage contact 170, the field 178 of the motor then being energized in the reverse manner through wires 182 and 184, thereby causing motor 66 to rotate in a reverse direction to raise the nut 76. Such lowering and raising of the nut will, of course, tend to correct the condition of the balloon which caused the eye 44 and the contactor arm 124 to turn, thereby restoring such arm and the contacts 126 and 128 carried thereby to the intermediate, non-contact-engaging, position shown in Figs. 3 and 5.

The motor 66 is preferably of the type energized by a low potential direct current source, the field being the stator and the rotor 180 being of a fixed high permeability magnet type made, for example, of Alnico. Such motor requires low current feed, thereby minimizing contact difficulties at the reversing switch. Furthermore, because of the permanent magnet rotor, the problem of reversing the motor is a simple one. Because by far the greater part of the necessary retarding torque on the brake drum 40 is contributed by the weight 62, the motor 66 may be of the very small fractional horse power type.

It will be seen that the above described structure is particularly characterized by the positiveness and accuracy with which it restores the doubles balloon to its preferred size and maintains it there. This arises from the fact that the balloon diameter and/or length measuring means is called upon, in such apparatus, merely to detect such characteristics of the balloon and that the work of altering the tension imposing means in the system to correct such balloon diameter change is done by a separately powered prime mover. Furthermore, the separately powered prime mover and its associated retarding or braking system is of such character that it continues to operate in such direction as to correct the change in the balloon diameter until the balloon measuring means indicates that the balloon has been restored to its predetermined preferred diameter. The described balloon diameter measuring and controlling device of the invention, therefore, is particularly stable in its operation, so that the system may operate for extended periods with no attention.

In order to damp possible vibrations or oscillations in the eye 44, there is provided a means, shown in Fig. 2, whereby the eye may be subjected to adjustable light braking force. A guide tube 186 is positioned in the space 90 within the top and bottom supporting plates 86 and 88, such tube receiving at its inner end the brake shoe 188, which may be made, for example, of felt. Such brake shoe has its inner end in engagement with the periphery of the eye 44, the outer end being thrust against the eye with variable force by means of the threaded plug 192, which is threadedly engaged in the outer end of the tube 186, there being a washer 190 interposed between the plug and the brake shoe. The plug 192 may be adjustably rotated by means of the adjusting stud 198 received in the seat 202 in the support 84 such stud being turned by the hand knob 200. The stud is connected to the plug 192 by means of the flexible cable 194, which extends through the curved passage 196 in the upper plate 86 and is non-rotatably connected to the plug 192, as shown.

In Fig. 6, there is shown a means for effecting balance between the take-up and cabling balloon and the one or more singles balloons, employing a rotatable balloon diameter measuring eye at the take-up balloon, such eye functioning in somewhat the same general manner as that described in connection with Figs. 1, 2, and 3. Fig. 6 such rotatable eye, however, automatically alters the heights of the singles balloons and the back tensions exerted thereon to control the doubles balloon. In Fig. 6, there is shown the cabling and take-up spindle 204 and one singles spindle 206, the thread from the singles balloon being delivered at 208 to the idle, unbraked, gathering pulley 210. A corresponding thread 212 is delivered from another singles spindle, not shown in this figure. The combined, as yet untwisted-upon-each-other, threads are led downwardly at 214 through the eye 216 of the take-up spindle 204 into balloon 218.

The eye 216 is, as shown, rotatably mounted in a support 220 affixed to a horizontal member 222 of the machine frame. Eye 216 is provided on its upper end with a bevel gear 224, such gear meshing with a first bevel gear 226 affixed to the shaft 228 extending to the left of eye 216, and with a second bevel gear 230 affixed to shaft 232, such shaft extending to the right of eye 216 and being connected to the eye governing means, which is not here shown but which is the same as that of spindle 206. The singles spindle at the right (not shown) delivers thread 212. The mechanism of this embodiment so interconnects the doubles and singles eyes that, under balanced conditions, with both the doubles and singles balloons of the desired diameter, and thus so related that the sum of the tensions in the singles equals the tension in the doubles balloon, the sum of the torques exerted on the singles balloon guiding eyes by their respective balloons will balance the torque exerted on the doubles balloon guiding eye by its balloon. The singles eyes are further so mounted that upon unbalance of such tensions, the mounting means for such singles eyes will move in a direction which is required to vary the height of the singles balloon, thereby to restore the balance in the system. In this device, there is also provided means for automatically varying the back tension imposed on the material in the singles balloons as the height of such balloons is varied.

The guiding eye for the singles spindle balloon 234 of spindle 206 is designated 236. Such eye has a thread guiding bore therethrough, such bore having a configuration similar to that of the eye 44 shown in Figs. 1, 2, and 3. Eye 236 is rotatably mounted, as shown, upon the vertically adjustable platform 238 which is carried by and adjusted by the two parallel worms 240. Each of such worms has therein a longitudinal slot 242, the worms passing freely through the platform 238 but being threadedly engaged in the nuts 244 fixedly mounted on the platform. On the bottom of the eye 236 there is affixed the ring gear 246 which meshes with the large gears 248, one such gear being associated with one worm and one with the other. Gears 248 are rotatably mounted in platform 238 and are retained therein against axial movement with respect to the platform. Each of gears 248 is provided with a radially inwardly protruding key member (not shown), the keys protruding into the respective slot 242 of the worms 240. It will be apparent that rotation of eye 236 will cause the platform 238 to move upwardly or downwardly along the worms 240, depending on the direction of such rotation. Because the two worms 240 are connected or intergeared through gears 248 and 246, and since the gear ratio from the worms to the eye is not large, no further driving interconnection between the worms is required.

Connected to the upper end of one of the worms 240 is the bevel gear 250 which meshes with the gear 252 at the left-hand end of shaft 228. For the purpose of explanation of the mode of operation of the device, it will be assumed that the direction of the rotation of balloon 234, and consequently of the run of material 208 through eye 236 upwardly over guide pulley 254, is in such direction that the left-hand edge of such balloon approaches the reader, and that the direction of rotation of balloon 218 is in such direction that the left-hand edge of such balloon retreats from the reader. Under such conditions, the torque exerted upon eye 216 by balloon 218 will tend to cause shafts 228 and 232 and the worms 240 to rotate in the direction of the curved arrows. The torque thus imposed upon worms 240 of each of the singles balloon eye adjusting mechanisms by the eye 216 is opposed by the sum of the torques imposed upon such worms by each of the eyes 236. When the configurations of the bores through the singles eyes and through the doubles eye have been correctly chosen, the bore through the doubles eye being somewhat similar to that of eye 44 of Figs. 1, 2, and 3, and when the variable back tension on the singles yarn is correctly correlated with vertical adjustment of the singles eyes 236, a position of vertical adjustment of the singles eyes will be attained wherein the torques exerted upon the connecting system between the singles and doubles eyes will balances, eyes 216 and 236 will be at rest, and the singles and doubles balloons will be at their desired medial diameters, the sums of the tensions in the singles strands equalling the tension in the doubles balloon.

If the doubles balloon should expand, the torque on the doubles eye 216 will increase, thereby driving shafts 228 and 232 in the direction of the curved arrows. This, in turn, will cause the worms 240 to rotate in the direction of the curved arrows and will elevate platform 238 against the action of the smaller opposing torques exerted on the singles eyes 236. Such elevation of the platform 238 will continue until a point is reached where the opposing torques exerted upon interconnecting shafts 228 and 232 by the singles and doubles eyes will again balance. The sum of the tensions in the singles balloons will accordingly have been increased, thereby balancing or slightly overbalancing the tension in the doubles balloon. If the doubles balloon tension is overbalanced, the system reacts in the opposite manner to reduce the tension in the singles balloons, thereby again seeking to restore the balance between singles and doubles tensions in the system.

Although, as above explained, a noticeable increase in the singles balloon tension can be effected simply by vertical adjustment of the guiding eye therefor, it is preferred to employ in the system of Fig. 6 an automatically adjustable back tension imposing means 254 in each of the singles flyers, such means operating to increase the back tension on the raising of the singles eye, and to decrease the back tension upon the lowering of the singles eye. One such back tension adjusting means is shown generally in Fig. 6 wherein it is incorporated in the flyer 256 of singles spindle 206 and acts in series with the first back tension imposing means, the magnetic ball means 258. The variable secondary tension device 254, shown in Fig. 6, is that shown in Fig. 29 of application Serial No. 225,209. It will suffice here to state that it is operated electro-magnetically, and that it is energized through the slip rings 260 and 262 affixed to the bottom of the flyer 256. Thus communication is continuously had with the tensioning means 254 through wires 264 and 266 connected to brushes contacting the slip rings 260 and 262. The wires are connected to a source of current $L_1$ and $L_2$ as shown, there being interposed in one side of the circuit a variable resistance which is responsive to the height of the singles eye 236 above the flyer of the singles spindle. Such variable resistance, in the embodiment shown, takes the form of a linear resistance member 268 mounted, as shown, on insulating brackets affixed to the frame of the machine adjacent the platform 238. A brush member 270 is mounted on an insulated support on the end of the platform 238 so as slidingly to contact the resistance member 268. The wire 272 is connected at its upper end to the lower end of resistance member 268, the other wire, 266, being connected to the brush 270. The particular variable back tension means 254 illustrated is of such construction that the tension which it imposes on the material passing through the flyer increases as energization of the wound field of means 254 decreases. Accordingly, as eye 236 rises, the effective resistance in the circuit contributed by the active portion of resistance 268 and the brush 270 increases; such effective resistance decreases as eye 236 descends. Accordingly, as the balloon 234 increases in height the back tension imposed on it by the singles spindle 206 increases, and as the balloon decreases in height the back tension decreases.

In Fig. 7, there is shown a further embodiment of the system wherein the tension in the singles balloons is varied to balance the tension in the doubles balloon. In such figure, parts of the apparatus which are similar to those shown in Fig. 6 are designated by the same reference characters. In this instance, the singles eye 274 is fixedly mounted in the vertically adjustable platform 276, such platform being adjustably mounted on the worms 278, each worm being threadedly engaged in nut 280 affixed to the platform. The thread 208 proceeds upwardly through the eye 274 over the idle guide pulley 254 and onto the idle and unbraked gathering pulley 210, where it is combined with the other singles strand 212, coming from another singles spindle (not shown) similar to the spindle 282 shown, the shaft 232 being connected to a singles eye adjusting means identical with that provided for spindle 282. The worms 278 of each eye adjusting mechanism are connected together, so as to rotate in the same direction, by means of the gears 284 positioned on the upper ends of such worms and the intermeshing gear 286, placed at the rear of gears 284 in such position and of such diameter as not to interfere with the vertical travel of thread 208.

Shaft 228 extends through, and is intergeared with, the torque motor 288, such motor being wound to a desired predetermined degree by the key 290. To the left-hand end of shaft 228 there is affixed the bevel gear 252 which meshes with the gear 250 on top of one of the worms 278. Assuming the same direction of travel of the flyer creating balloons as was assumed in Fig. 6, the eye 216 will impose a torque on shafts 228 and 232 and worms 278 in the direction of the curved arrows. This will tend to cause each of the platforms 276 and eyes 274 to rise. Opposing such torque are both those contributed by the torque motor 288 and that imposed upon worms 278 by the upward thrust on platforms 276 caused by the upward travel of each of the singles strands through its eye. When the configuration of the bore through eye 216 is suitably chosen, and the pitch of worms 278 is likewise suitably chosen, and when the torque motor 288 is wound to a correct degree, the eye 216 will remain non-rotatable when the balloon 218 is at the desired medial diameter. Should such balloon expand unduly, however, the shafts 228 and 232 and the worms 278 will rotate in the direction of the curved arrows, thereby causing each of the platforms 276 to rise and causing the vertical expansion of each of the singles balloons. A point will be reached at which the sum of the tensions in the singles balloons again balances the tension in the doubles balloon, so that the system in general is in balance. Should the balloon 218 contract unduly, the reverse action takes place.

As in the case of the apparatus shown in Fig. 6, in Fig. 7 there is provided a means automatically increasing the back tension on the singles strands upon the increase in height of such singles balloon. Here again a linear resistance member 268 is employed, such resistance member cooperating with the brush 270 on the end of platform 276. The particular back tension device 292 in spindle 282 is of the type, shown in Fig. 28 of application Serial No. 225,209, wherein under operating conditions the back tension imposed by the device increases as the device is increasingly energized. For this reason, the upper end of resistor 268 is connected to line $L_2$. The two wires 294 and 296 proceeding from wire $L_1$ and the brush 270, respectively, are led to the variable back tension means 292 by brushes making connection with slip rings (not shown) on the flyer (not shown) of spindle 282, in the manner fully disclosed in Fig. 28 of application Serial No. 225,209.

In the embodiments of both Figs. 6 and 7, above described, use is made of the balloon diameter measuring function of the doubles balloon guiding eye 216, and also of singles balloon guiding eyes 236, in the embodiment of Fig. 6. Thus, in Fig. 6 the singles and doubles eyes, in effect, constantly measure the diameter of their respective balloons and, by means of the described intergearing, compare the diameters of such balloons and effect the required changes in tension in the singles balloons to restore the doubles balloon to its preferred medial diameter, likewise as measured by the doubles eye. In Fig. 7 the doubles balloon eye also constantly measures the diameter of such balloon, and, through the described mechanism, restores the doubles balloon to its medial diameter when it varies therefrom.

In Figs. 8 and 9, there is fragmentarily shown a novel twisting mechanism whereby the elongated flexible material travelling through the flyer thereof may be very accurately controlled as to its speed of travel. As will be apparent hereinafter, the apparatus of Figs. 8 and 9 may be employed as either a singles supply spindle of the uptwister type or a cabling and twisting mechanism of the downtwister type. The speed control mechanism incorporated in the flyer of such apparatus may be operated in a variety of manners, among them being control by the rotatable balloon diameter measuring eye previously described herein.

As shown in Fig. 8, the main driving and supporting shaft 298 for the twisting mechanism 300 is hollow, having an axial bore therethrough. Shaft 298, which is driven by a belt (not shown) entrained over the pulley 299, fragmentarily shown in Fig. 8, affixed to the shaft, is mounted in a supporting member 302, such member 302 being received in a portion of the machine frame, not shown. Shaft 298 is, as shown, rotatably supported in supporting member 302 by bearings, of which one is shown at 304. Supported within the bore in shaft 298 is a small axially located shaft 306, such shaft being journalled in shaft 298 through the medium of the bearings 308.

On the bottom of the small shaft 306, there is positioned the worm gear 310, keyed to the shaft. Meshing with such work gear is the worm 312 driven by the reversible low voltage motor 314 as indicated in Fig. 8. The worm gear 310 and the worm 312 are of such character as to be irreversible, that is, they effectively lock the small shaft 306 from rotation except when the motor 314 is running.

Journalled within the flyer 316, in the recess 318 therein, is the cord engaging and advancing roller member generally designated 320. Member 320 is, as shown, so positioned that its axle 322 extends transverse to the axis of rotation of the flyer. The roller 320 is of such diameter and is so positioned that the longitudinal center of the inner side of its central cord engaging drum portion 324 lies tangent to the axis of the flyer 316, along which cord material 326 proceeds after leaving such roller, assuming that the mechanism 300 is employed as a two-for-one twister of the downtwister type. The cord 326, proceeding inwardly through the radial passage 328 in flyer 316, may be wrapped one or more times about such central portion 324 of the roller so as to have substantially non-slipping engagement therewith. As mentioned, the cord then leaves such portion 324 and travels upwardly through the bore in the enlarged portion 330 of the central shaft of the spindle, which in this instance is discontinuous, the flyer 316 being interposed between the portions 298 and 330, both such parts 298 and 330 being fixedly connected to flyer 316.

Roller 320 is provided with end flanges, the outer portions of such flanges having gears 332 thereon. Gears 332 mesh with the gears 334 positioned on the ends of the intermediate gear member 336 which is also journaled in a recess in the flyer on an axle 338, such axle being parallel to axle 322. Centrally of member 336 there is positioned the hour-glass worm gear 340 which meshes, as shown, with the small hour-glass worm gear 342 fixedly attached to the top of shaft 306. Shaft 306 is positioned coaxially of the flyer. Gear 340 and worm 342 are made of such hand, and worm 342 and gears 340, 334, and 332, and drum 324 are made of such relative sizes, that, when the flyer 316 rotates with the worm gear 310, and thus the shaft 306 and the worm 342, locked from rotation, material 326 will be drawn into the flyer at a speed substantially equal to the speed theoretically required to maintain the balloon of mechanism 300 at the desired medial diameter. Such driving of member 320 results, of course, by the rotation of members 320 and 336 as a unit with the flyer about the worm 342 and thus the driving of member 320 through the medium of the gears 334 and 332 and also the gear 340 and the worm 342.

With the various parts of the apparatus of Figs. 8 and 9 properly proportioned for the operation in hand, the shaft 306 and the worm 342 carried thereby will, as explained, remain at rest when the balloon of the mechanism is at the proper or medial diameter. The motor 314 which, as explained, will either increase or decrease the speed of the flexible material past the drum 324, depending upon the direction of rotation of the motor, may be manually controlled as by a rheostat, if desired, since it is located outside the balloon of the spindle. Ordinarily, however, it is preferred that such motor, and thus the speed of travel of the material past the drum 324, shall be under the operation of a balloon diameter measuring means, such as those disclosed in the applications of which the present application is a continuation-in-part, or by the rotatable balloon diameter measuring eye shown in Figs. 1, 2, and 3 herein. In the latter case, the motor 314 may be connected to the reversing switch 82 of such rotatable eye 44 in the same manner as is the motor 66 in Fig. 5. Such balloon diameter measuring eye and its switch will be so connected to motor 314 that when the balloon of mechanism 300 expands unduly, the motor 314, the shaft 306, and the worm 342 will be driven in such direction as to increase the speed of the drum 324 for the period during which the motor is energized. The rotatable eye will immediately detect the decrease in diameter of the balloon and will thereupon shut off the motor 314 when the balloon has been restored to the desired medial diameter. The reverse action of the speed control mechanism for drum 324 will take place when the balloon decreases in size unduly, the motor 314 then being operated in the reverse direction to decrease the speed of the drum 324 during the time that the motor remains in operation.

In Fig. 10, there is shown a three-spindle system employing both as singles supply twisting mechanisms and as the cabling and twisting mechanism spindles made in accordance with Figs. 8 and 9. For simplicity of illustration the means for supporting the flyers in this embodiment are omitted at each spindle. In such system, the gathering pulley 344 is positively driven by the belt 346 in synchronism with the cabling and doubling mechanism 348 through the medium of the worm and worm gear meshing with the main shaft of such mechanism. The flyer 390 of mechanism 348 is driven by a belt (not shown) entrained over the driving pulley 349 therefor. Each of the singles supply spindles 350 and 352, respectively, is equipped with a flyer, such as shown in Fig. 8, which is rotated by a belt (not shown) entrained over the driving pulleys 351 and 353, respectively, each such flyer having a yarn forwarding drum mechanism 354 and 356, respectively, such mechanisms being under the control of the motors 358 and 360. In such singles twisting mechanisms, the material speed controlling drums act as means for imposing a variable back tension on the material additive to the tension imposed by the magnetic ball tensioning means 362 and 364, respectively. The rotatable eyes 366 and 368, respectively, of the mechanisms 350 and 352 are mounted upon adjustable platforms 370 and 372 whereby the singles balloons may have the desired height. The rotatable eye 366 for singles spindle 350 is provided with the reversing switch mechanism 374 operated thereby, such switch mechanism being similar to that shown at 82 in Figs. 1, 2, and 3, such switch as shown controlling the operation of the motor 358. A similar switch mechanism 376 is provided at eye 368 of spindle 352. It will be apparent that, since substantially no slippage occurs between the material in the singles twisting mechanisms and the speed controlling drums 354 and 356 therein, and since the material delivered from such singles supply twisting mechanisms does not slip substantially at the driven gathering pulley, it is necessary to control the singles balloons 378 and 380 quite accurately. This is done by the balloon diameter detecting rotatable eye, the reversing switch operated thereby, and the motor and its driving mechanism of each singles spindle, whereby the peripheral speed of the drums 354 and 356 of the singles twisting mechanisms is controlled.

The center doubling and twisting mechanism 348 is provided with the customary take-up bobbin 382 which is driven from the main shaft of the mechanism through the compensating clutch 384 by which the tension in the material as wound upon the bobbin is maintained substantially constant. The doubled and twisted material 386 in the doubles balloon 388 is drawn into the flyer 390 of the doubling and twisting mechanism 348 by the drum 392, which is of the same construction as that shown in Fig. 8, such drum being under the control of the motor 394. The rotatable eye 396 above the doubling and twisting mechanism 348 is, as in the case of the singles twisting mechanisms, initially adjustable in height. Such rotatable eye, through the medium of the reversing switch 398 connected thereto and the motor 394, accurately controls the diameter of the balloon 388, the upper end of which has substantially non-slipping engagement with the gathering pulley 344 and the inner end of which has substantially non-slipping engagement with the drum 392.

*It will be seen that in both the embodiments of (1) Figs. 1–5, inclusive, and (2) Fig. 10, employing the elements of Figs. 8 and 9, the balloon of the central take-up spindle is held "tight," that is, the only yieldably or resiliently held zone or run of the strand between the means feeding the strand into the balloon and the means feeding the strand out of the balloon is the balloon itself. The strand in the balloon of both such embodiments, of course, is held under yielding tension by the centrifugal force to which it is subjected. The variable speed means 40 in Fig. 1 for feeding the strand 42 into the balloon 12, and the constant speed means 16 for feeding it out of the balloon are unyieldingly located at fixed distances from the respective ends of the balloon. In Fig. 10, the constant speed means 344 for feeding strand 386 into balloon 388 and the variable speed means 392 for feeding the strand out of such balloon are unyieldingly located at fixed distances from the respective ends of the balloon 388. As a result of such construction of the spindles of embodiments (1) and (2), there are no variables in the run of the material or strand containing the balloon, other than the balloon itself.*

*The means for detecting changes in the diameter of the balloon in each of embodiments (1) and (2) detects a force generated by the balloon by interaction with the strand in the run thereof from and including the zone of the strand at the means feeding the strand into the balloon and the zone of the strand at the means feeding the strand out of the balloon. Such interaction is, in the embodiments shown, that of frictional engagement between the strand and a rotatable friction surface disposed at fixed distances from the ends of the balloon, the torque between the strand and the friction surface serving as a measure of the force generated by the balloon. The engagement between the strand and the balloon measuring device is such that the measuring of balloon diameter, and changes in balloon diameter, does not itself alter the diameter of the balloon or introduce any variables into the system.*

*In Fig. 1 the friction surface is the bore of the rotatable member 44 positioned at the entrance end of the balloon 12, the resulting torque on the bore of member 44 governing the strand-retarding torque imposed on the one or more loops of strand 42 passing around drum 40 of the variable speed means for feeding strand 42 into the balloon.*

*In Fig. 10 the friction surface is the bore of the rotatable member 396 positioned at the entrance end of the balloon 388. The torque on the bore of member 396 governs the strand-forwarding torque imposed on the one or more loops of strand 386 passing around the capstan 392 of the variable speed means for feeding strand 386 out of the balloon.*

In Figs. 11 and 12, there is shown an apparatus, in accordance with the invention, for continuously measuring the torque exerted on the guiding eye of the free end of a balloon spaced from the flyer, and, by calibration, continuously measuring the diameter of the balloon.

The rotatable eye 400, which preferably has a configuration of the bore similar to that shown in Figs. 1, 2, and 3, is, in this instance, mounted by means of ball bearings 402 in the platform 404, such platform being fixedly supported on parts of the machine frame at a given optimum distance above the flyer (not shown) to which the material 406 is fed.

The eye 400 carries on its upper outer surface gear 408, which meshes, as shown, with gear 410 mounted on top of platform 404. Gear 410 meshes, in turn, with pinion 412, mounted on shaft 414 projecting from the bottom of spring torque motor 416, which is mounted on the platform as shown in Fig. 11.

On its upper end, above the top of the casing of motor 416, the shaft 414 carries the pointer 418 affixed thereto, such pointer cooperating with the two scales 420 and 422, on disc 424, which may be rotatably mounted on top of the torque motor coaxial with shaft 414, the disc being selectively locked in a desired angular position by the washer 426 and stud 428, the edge of the washer overlapping the edge of the disc. The motor 416 may be wound to deliver the desired torque to eye 400 by the key 430, one end of the key having a pointer 432 affixed thereto, such pointer cooperating with the scale 434. Such scale is selectively locked in selected angular position by a washer and stud 436 similar to those described at 426 and 428.

The motor 416 is of such construction as to deliver to eye 400 a torque which is clockwise in direction, opposing the torque imposed on the eye by the material at the top of the balloon within the eye, such balloon, in this instance, rotating counter-clockwise, as indicated by the curved arrow. It will be apparent that variations in the torque imposed on eye 400 by material 406 will cause the eye to rotate until the balance between the torque imposed thereon by the balloon balances that imposed thereon by motor 416, at which condition the eye will cease to rotate, the material 406 slipping along the surface of the passage therethrough. Such rotation of the eye under operating conditions may readily be read on scales 420 and 422, when the scales are suitably calibrated, directly in terms of torque imposed on the eye by the balloon on one such scale, as 420, and directly in terms of balloon diameter, on scale 422, when the flyer speed, the height of the eye above the flyer, the configuration of the passage through the eye, and the character of the material 406 are constant, and when the amount to which the spring of motor 416 is wound up from a dead or completely unwound condition is known. Alternatively under such conditions, scale 420 may be calibrated to read directly in terms of balloon tension. The adjustable mounting of disc 424 allows the scales 420 and 422 to be suitably "zeroized" before a reading is taken, if desired.

Also to aid in the taking of readings, there is provided a pawl 438 tightly pivotally mounted at 440 on top of platform 404, the end 442 of the pawl being selectively moved into engagement with gear 408 to lock the eye 400 from rotation, or moved away from the gear to allow the eye to rotate, by handle 444. Thus with the twister at rest, the eye may be initially locked from rotation by the pawl, and spring motor 416 wound to give sufficient torque to balance the eye when the balloon is at its medial diameter. The twisting machine may then be placed in operation, the eye 400 being unlocked when the machine has reached steady operating conditions, after which the scales 420 and 422 may be read to give instantaneous torque and balloon diameter measurements, respectively, or, as above set out, scale 420 may be read to give a direct reading of the balloon tension, when it is so calibrated.

Although the apparatus and method of the invention have been described above as measuring the diameter and/or tension of the balloon of the twisting spindle, and as controlling the balloon diameter and/or tension in accordance with such measurement, it will be apparent that in the practice of the invention the measurement of balloon diameter, with various known spindle components, will give a measurement of length of the elongated flexible material in the balloon. Thus, with a known constant spindle speed, a known flyer radius, a given speed of travel of the material through the spindle, a given height of the guiding eye above the spindle, a given flyer and yarn passage configuration therein, when a given elongated flexible material of substantially uniform properties longitudinally thereof is twisted in the spindle, the balloon diameter and the length of the material in the balloon bear a determinable, fixed relationship to each other. Such relationship may readily be determined, with a given material and with the various spindle component factors constant, by taking ultra-high speed pictures of the spindle in operation, a succession of pictures being taken at a succession of balloon diameters different from each other by small increments. The length of the material in the balloon corresponding to each balloon size may then readily be measured from the pictures, and a graph of such values made up. Further, scale 422 on disc 424 (Figs. 11 and 12) may be calibrated, if desired, to read directly in terms of the length of the material in the balloon, instead of balloon diameter. As an alternative, the scales on disc 424 may be calibrated to give simultaneous readings of balloon diameter and length of material in the balloon, as well as the reading of the torque imposed on the eye by the balloon.

Whereas for purposes of illustration I have shown and described preferred embodiments of the method of and apparatus for controlling the diameter of the balloon of the twisting spindle, specifically the take-up spindle of a three-spindle cord twisting machine, and also the balloons of a single supply twisting spindle, and have also shown and described a preferred embodiment of the method and apparatus for measuring the diameter of a balloon of a twisting spindle, it is to be understood that such embodiments are illustrative only, and that the invention is capable of considerable variation as to details. The invention is, therefore, to be defined by the scope of the claims appended hereto.

*This reissue application is related to application Serial No. 4,040, filed January 22, 1960, and to application Serial No. 4,973, filed January 27, 1960, which in turn are continuations-in-part of application Serial No. 214,866, filed March 10, 1951, and Serial No. 261,704, filed December 14, 1951. The claims added herein by reissue relate to specific aspects of the earlier inventions claimed in applications Serial Nos. 4,040 and 4,973.*

I claim as new the following:

1. The method of determining the diameter of the ballon of elongated flexible material at a spindle having a balloon forming flyer and a guiding eye for the free end of the ballon positioned at a predetermined distance from the flyer, which comprises determining for such spindle, with a given spindle speed, distance of the eye from the flyer, and a given material, the relationship between the torque imposed on the eye by the material in the balloon and the diameter of the balloon for a number of representative balloon diameters throughout the range of operative balloon diameters, measuring the torque imposed on the eye by the material in the balloon, and applying such measurement to the determined torque-diameter relationship.

2. The method of determining the length of elongated flexible material in the balloon of a spindle having a balloon forming flyer and a guiding eye for the free end of the balloon positioned at a predetermined distance from the flyer, which comprises determining for such spindle, with a given spindle speed, distance of the eye from the flyer, and a given material, the relationship between the torque imposed on the eye by the material in the balloon and the length of the material in the balloon for a number of representative balloon diameters throughout the range of operative balloon diameters, measuring the torque imposed on the eye by the material in the balloon, and applying such measurement to the determined torque-length of material in balloon relationship.

3. The method of determining the diameter of a free-flying balloon of flexible elongated material created and maintained by a flyer between such flyer and a balloon guiding eye, the diameter of the balloon having a predetermined relationship to the torque exerted on the guiding eye by the balloon, which comprises positioning the guiding eye for rotation at a location at a fixed distance from the flyer, passing the material through the eye at the free end of the balloon, and measuring the torque exerted on said eye by the material in said balloon passing through the eye, and applying such measurement to the determined torque-diameter relationship.

4. The method of determining the diameter of a free-flying balloon of flexible elongated material created and maintained by a flyer between such flyer and a balloon guiding eye, the diameter of the balloon having a predetermined relationship to the torque exerted on the guiding eye by the balloon, which comprises positioning a guiding eye opposite the flyer at a fixed predetermined distance therefrom, said eye having a material guiding passage therethrough of such configuration that the average length of the lever arm from the line of contact between the eye and the material and the axis of the eye increases as the balloon diameter increases and decreases as the balloon diameter decreases, and measuring the torque exerted on said eye by said balloon.

5. Apparatus for determining the diameter of a free-flying loop of flexible elongated material created and maintained by a flyer, which comprises a rotatable loop guiding eye positioned opposite and spaced a predetermined distance from the flyer, means yieldably opposing rotation of the eye in the direction of rotation of the loop, and means for measuring the torque exerted on said eye by the material in said loop.

6. Apparatus for determining the diameter of a free-flying balloon of flexible elongated material created and maintained by a flyer, which comprises a rotatable balloon guiding eye positioned opposite and spaced a predetermined distance from the flyer, means yieldably opposing rotation of the eye in the direction of rotation of the loop, and means for measuring the torque exerted on said eye by the material in said balloon passing through the eye.

7. Apparatus for determining the diameter of a free-flying balloon of flexible elongated material created and maintained by a flyer, a guiding eye for the free end of the balloon, said eye having a material guiding passage therethrough of such configuration that the average length of the lever arm from the line of contact between the eye and the material and the axis of the eye increases as the balloon diameter increases and decreases as the balloon diameter decreases, which comprises means positioning the guiding eye opposite and spaced a predetermined distance from the flyer, said last named means allowing rotation of the eye about the axis of the material guiding passage therethrough, and means for measuring the torque exerted on said eye by said balloon.

8. Apparatus for determining the diameter of a free-flying balloon of flexible elongated material created and maintained by a flyer, which comprises a rotatable balloon guiding eye positioned opposite and spaced a predetermined distance from the flyer, and means for measuring the torque exerted on said eye by the material in said balloon passing through the eye in a direction substantially coaxial of the eye, said last named means comprising means yieldingly opposing rotation of the eye by the balloon, said last named means imposing on the eye a torque which increases as the eye progressively rotates in the direction of rotation of the balloon, and means connected to the eye indicating the amount of rotation of the eye.

9. Apparatus for determining the diameter of a free-flying balloon of flexible elongated material created and maintained by a flyer, comprising a guiding eye for the free end of the balloon, said eye having a material guiding passage therethrough of such configuration that the average length of the lever arm from the line of contact between the eye and the material and the axis of the eye increases as the balloon diameter increases and decreases as the balloon diameter decreases, material guiding means beyond the eye to guide the material substantially along the axis of the bore of the eye, means positioning the guiding eye opposite and spaced a predetermined distance from the flyer, said last named means allowing rotation of the eye about the axis of the material guiding passage therethrough, and means for measuring the torque exerted on said eye by said balloon, said last named means comprising means yieldingly opposing rotation of the eye by the balloon, said last named means imposing on the eye a torque which increases as the eye progressively rotates in the direction of rotation of the balloon, and means connected to the eye indicating the amount of rotation of the eye.

10. The method of controlling the balloon of elongated flexible material at a device having a balloon forming flyer and a guiding eye for the free end of the balloon, said guiding eye being spaced a predetermined distance from the flyer, which comprises measuring the torque imposed on the eye of the balloon by the material in the balloon, and varying the tension of the material in the balloon directly in accordance with such measurement.

11. The method of controlling the balloon of elongated flexible material through which the material travels at a device having a balloon forming flyer and a guiding eye for the free end of the balloon spaced a predetermined distance from the flyer, the material in the balloon whipping around the bore of the eye, which comprises measuring the torque imposed on the eye of the balloon by the material in the balloon, and varying the relative speeds of feeding the material into and out of the balloon in accordance with such measurement whereby to maintain the diameter of the balloon within predetermined limits.

12. Apparatus for controlling the length of elongated flexible material in the balloon of a spindle having a balloon forming flyer and an eye having a material receiving bore for guiding the free end of the balloon, the eye being spaced a predetermined distance from the flyer, the material in the balloon whipping around the bore of the eye, which comprises means for measuring the torque imposed on the eye by the material in the balloon, and means responsive to the last named means for varying the length of the material in the balloon inversely in accordance with such measurement.

13. A twisting spindle for elongated flexible material, said spindle being of the type which creates and maintains thereat a balloon of the material in free flight through the air, said spindle having a balloon creating flyer, a material forwarding means mounted in the flyer for engaging material passing through the flyer and for governing the speed of travel of such material, means for driving the flyer, a shaft coaxial of the flyer, a drive connection between the shaft and the material forwarding means, and a reversible driving means connected to the shaft to vary the speed of rotation of the shaft relative to the flyer, whereby to vary the speed of driving of the material forwarding means.

14. A twisting spindle for elongated flexible material, said spindle being of the type which creates and maintains thereat a balloon of the material in free flight through the air, said spindle having a balloon creating flyer, a material forwarding means mounted in the flyer for engaging material passing through the flyer and for governing the speed of travel of such material, means for driving the flyer, a shaft coaxial of the flyer, a worm on the shaft, a worm gear drivingly connected to the material forwarding means and meshing with the worm, a reversible prime mover, means for controlling the prime mover, and a driving connection between the prime mover and the shaft, said driving connection including means to lock the shaft from rotation except when the prime mover is rotating.

15. Apparatus for twisting an elongated flexible material which comprises means rotatable about an axis for creating and maintaining a free-flying loop of such material, a rotatable loop guiding eye positioned opposite and spaced a predetermined distance from the loop creating means, means yieldably opposing rotation of the eye in the direction of rotation of the loop, and means responsive to rotation of the eye for controlling the apparatus.

16. Apparatus for twisting an elongated flexible material which comprises means for creating and maintaining a free-flying loop of such material, a rotatable loop guiding eye positioned opposite and spaced a fixed distance from the loop creating means, means yieldably opposing rotation of the eye in the direction of rotation of the loop, an apparatus controlling electric circuit, and a switch in such circuit and operated by rotation of the eye selectively to make and break the circuit.

17. The method of detecting changes in the diameter of a free-flying loop of elongated flexible material at a device having a loop forming flyer and a guiding eye for the free end of the loop, the diameter of the loop having a predetermined relationship to the torque exerted on the guiding eye by the loop, the guiding eye being positioned at a fixed distance from the flyer, which comprises continuously measuring the torque imposed on the eye by the material in the loop.

18. The method of detecting changes in the length of elongated flexible material in the balloon of a spindle having a balloon forming flyer and a guiding eye for the free end of the balloon positioned at a predetermined distance from the flyer, and wherein the length of material in the balloon has a predetermined relationship to the torque exerted on the guiding eye by the balloon, which comprises positioning the rotatable balloon guiding eye opposite the flyer, passing the material through the eye at the free end of the balloon in a direction substantially coaxial of the eye, and continuously measuring the torque exerted on said eye by the material in said balloon passing through the eye.

19. Apparatus for detecting changes in the diameter of a free-flying loop of flexible elongated material created and maintained by a flyer, which comprises a loop guiding eye positioned opposite and spaced a fixed distance from the flyer, and means for continuously measuring the torque exerted on said eye by the material in said loop.

20. Apparatus for handling elongated flexible material held under tension in a zone in which it forms a rotating bulging loop in flight through the air, comprising loop-contacting means mounted in a fixed location with respect to the ends of the loop for detecting changes in the size of the loop, and means responsive to the last named means for varying the tension of the material in the loop.

21. Apparatus for handling elongated flexible material advancing under tension through a zone in which it forms a rotating bulging loop in flight through the air, comprising loop-contacting means mounted in a fixed location for detecting changes in the size of the loop, and means responsive to the last named means for varying the tension of the material in the loop.

22. Apparatus for handling elongated flexible material advancing under tension through a zone in which it forms a rotating bulging loop in flight through the air, comprising a loop-contacting member rotatably mounted in a fixed location and adapted to be turned in the direction of rotation of the loop by contact therewith for detecting changes in the size of the loop, and means responsive to the rotation of the loop-contacting member for varying the tension of the material in the loop.

23. Apparatus for handling elongated flexible material advancing under tension through a zone in which it forms a rotating bulging loop in flight through the air, comprising a circular loop-contacting member rotatably mounted in a fixed position on an axis substantially coincident with the axis of the loop and adapted to be turned in the direction of rotation of the loop by contact therewith for detecting changes in the size of the loop, and means responsive to rotation of the circular member for varying the tension of the material in the loop.

24. Apparatus for handling elongated flexible material advancing under tension through a zone in which it forms a rotating bulging loop in flight through the air, comprising a circular loop-contacting member rotatably mounted in a fixed position on an axis substantially coincident with the axis of the loop and adapted to be turned in the direction of rotation of the loop by contact therewith for detecting changes in the size of the loop, means for yieldingly turning said circular member opposite to the direction of rotation of the loop, and means controlled by rotation of the circular member for varying the tension of the material in the loop.

25. Apparatus for handling elongated flexible material advancing under tension through a zone, means for rotating the material in a bulging loop in such zone, loop-contacting means mounted in a fixed location with respect to the loop rotating means for detecting changes in the size of the loop, and means responsive to the last named means for varying the tension of the material in the loop.

26. Apparatus for handling elongated flexible material advancing under tension through a zone, means for rotating the material in a bulging loop in such zone, the loop having its ends spaced apart and lying generally on the axis of rotation of the loop, means mounted in a fixed location with respect to the loop rotating means and adapted to be contacted by the strand in the loop as the loop rotates with respect thereto, said means being responsive to changes in engagement therewith by the strand in the loop, and means responsive to the strand-contacting means to change the size of the loop.

27. Apparatus for handling elongated flexible material advancing under tension through a zone, means for rotating the material in a bulging loop in such zone, the loop having its ends spaced apart and lying generally on the axis of rotation of the loop, means mounted in a fixed location with respect to the loop rotating means and adapted to be contacted by the strand in the loop as the loop rotates with respect thereto, said means being responsive to changes in engagement therewith by the strand in the loop, and means responsive to the strand-contacting means to change the tension of the material in the loop.

28. Apparatus for twisting an elongated flexible material which comprises means for creating and maintaining a free-flying loop of such material, a rotatable circular member coaxial of and spaced a predetermined distance from the loop creating means, said circular member being adapted to be engaged by the loop and to be turned thereby, means yieldably opposing rotation of the member in the direction of rotation of the loop, and means responsive to rotation of the member for controlling the apparatus.

29. Apparatus for handling elongated flexible material advancing under tension through a zone comprising, in combination, means for rotating the material in a bulging loop in such zone, the loop having its ends spaced apart and lying generally on the axis of rotation of the loop, guide means for the end of the loop remote from the means for rotating the material in the loop, and mechanism for controlling the apparatus in response to variations in the loop, said mechanism comprising a rotatable circular member coaxial of and spaced a predetermined distance from the means for rotating the material in the loop, said circular member being adapted to be engaged by the loop and to be turned thereby, means yieldably opposing rotation of the circular member in the direction of rotation of the loop, and means responsive to rotation of the circular member for controlling the apparatus.

*30. Apparatus for controlling the balloon of an elongated flexible material twisting spindle which creates and receives material from a balloon in free flight through the air comprising a flyer, means for continuously feeding material into the balloon at an essentially constant rate, means for continuously withdrawing material from the balloon and thence in through the flyer, the material in the run thereof from and including the zone of feeding of the material into the balloon and the zone of withdrawing of the material being held under tension with the balloon as the only resiliently maintained salient zone between such two feeding zones, and means for detecting changes in the diameter of the balloon and for controlling the means for withdrawing material from the balloon to vary the speed at which the material is withdrawn from the balloon whereby to maintain the balloon diameter within predetermined desired limits, said last named means including tension sensitive means contacting the said run of material extending between and including the said two zones of feeding of the material.*

*31. Apparatus as set forth in claim 30, wherein the tension sensitive means includes a rotatable solid of revolution mounted on an axis fixed with respect to the axis of the flyer, said tension sensitive means being positioned at a fixed distance from the flyer.*

*32. Apparatus as set forth in claim 30, wherein the means for withdrawing material from the balloon includes a rotatable driven capstan about which at least one coil of the material extends and with the surface of which*

*the material has material-forwarding frictional engagement.*

*33. Apparatus as set forth in claim 32, wherein the tension sensitive means includes a rotatable solid of revolution mounted on an axis fixed with respect to the axis of the flyer, said solid of revolution being positioned at a fixed distance from the flyer, the material passing by the solid of revolution and having frictional engagement therewith, whereby variations in torque of engagement between the material and the solid of revolution yield an indication of variations in tension in the material.*

*34. The method of controlling the balloon of an elongated flexible material twisting spindle which creates and receives material from a balloon driven in free flight through the air by a driven rotatable flyer, which comprises continuously feeding material into the balloon at an essentially constant rate, continuously withdrawing material from the balloon and thence in through the flyer, holding the material in the run thereof from and including the zone of feeding of the material into the balloon and the zone of withdrawing of the material under tension with the balloon as the only resiliently maintained salient zone between such two feeding zones, contacting the material at a location in the said run of material extending between and including the said two zones of feeding of the material with a tension sensitive means, and controlling the speed of withdrawal of the material the balloon by the response of said tension sensitive means.*

*35. The method of controlling the balloon of an elongated flexible material twisting spindle which creates and receives material from a balloon driven in free flight through the air by a driven rotatable flyer, which comprises continuously feeding material into the balloon at an essentially constant rate, continuously withdrawing material from the balloon and thence in through the flyer, holding the material in the run thereof from and including the zone of feeding of the material into the balloon and the zone of withdrawing of the material under tension with the balloon as the only resiliently maintained salient zone between such two feeding zones, maintaining the zones of feeding of the material into and out of the balloon at fixed distances from the respective ends of the balloon, contacting the material at a location in the said run of material extending between and including the said two zones of feeding of the material with a tension sensitive means, and controlling the speed of withdrawal of the material from the balloon by the response of said tension sensitive means.*

*36. The method of controlling the balloon of an elongated flexible material twisting spindle which creates and receives material from a balloon driven in free flight through the air by a driven rotatable flyer, which comprises continuously feeding material into the balloon at an essentially constant rate, continuously withdrawing material from the balloon and thence in through the flyer, holding the material in the run thereof from and including the zone of feeding of the material into the balloon and the zone of withdrawing of the material under tension with the balloon as the only resiliently maintained salient zone between such two feeding zones, maintaining the zones of feeding of the material into and out of the balloon at fixed distances from the respective ends of the balloon, contacting the material at a location in the said run of material with a rotatable body of revolution with the surface of which the material has frictional engagement as it travels therepast, and controlling the speed of withdrawal of the material from the balloon in accordance with variations in the frictional engagement between the body and the material.*

*37. The method as defined in claim 36, wherein the rotatable body of revolution is mounted on a fixed axis, and comprising diverting the material by said contact with the body of revolution, and holding the body of revolution from movement as a whole in the direction opposite the direction of diversion of the material.*

*38. Apparatus for controlling the balloon of an elongated flexible material twisting spindle which creates and receives material from a balloon in free flight through the air comprising a flyer, means for continuously feeding material into the balloon at an essentially constant rate, means for continuously withdrawing material from the balloon and thence in through the flyer, the material in the run thereof from and including the zone of feeding of the material into the balloon and the zone of withdrawing of the material being held under tension with the balloon as the only resiliently maintained salient zone between such two feeding zones, and means for detecting changes in the diameter of the balloon and for controlling the means for withdrawing material from the balloon to vary the speed at which the material is withdrawn from the balloon whereby to maintain the balloon diameter within predetermined desired limits, said last named means including a rotatable solid of revolution mounted on an axis fixed with respect to the axis of the flyer, said solid of revolution being positioned at a fixed distance from the flyer, the material passing by the solid of revolution, being diverted thereby, and having frictional engagement therewith, the solid of revolution being mounted so as to be held from movement as a whole in the direction opposite the direction of diversion of the material, whereby variations in torque of engagement between the material and the solid of revolution yield an indication of variations in tension in the material.*

References Cited in the file of this patent
or the original patent

UNITED STATES PATENTS

| | | |
|---|---|---|
| Re. 23,509 | Uhlig | May 27, 1952 |
| 723,178 | Norman | Mar. 17, 1903 |
| 1,031,366 | Norman | July 2, 1912 |
| 2,030,110 | Keight | Feb. 11, 1936 |
| 2,397,153 | Naumann | Mar. 26, 1946 |
| 2,550,136 | Clarkson | Apr. 24, 1951 |
| 2,560,848 | Cochran | July 17, 1951 |
| 2,586,037 | Heffelfinger | Feb. 19, 1952 |
| 2,731,786 | Klein | Jan. 24, 1956 |